(12) United States Patent
Somerville et al.

(10) Patent No.: US 7,557,551 B1
(45) Date of Patent: Jul. 7, 2009

(54) AMPLITUDE MODULATED SWITCHING VOLTAGE REGULATOR

(75) Inventors: Thomas A. Somerville, Tempe, AZ (US); Michael R. Kay, Summerfield, NC (US); David C. Dening, Stokesdale, NC (US)

(73) Assignee: RF Micro Devices, Inc., Greensboro, NC (US)

( * ) Notice: Subject to any disclaimer, the term of this patent is extended or adjusted under 35 U.S.C. 154(b) by 371 days.

(21) Appl. No.: 11/457,557

(22) Filed: Jul. 14, 2006

(51) Int. Cl.
*G05F 1/00* (2006.01)
*H01Q 11/12* (2006.01)

(52) U.S. Cl. .................... 323/282; 455/127.1
(58) Field of Classification Search ............ 323/222, 323/228, 241, 242, 243, 267, 269, 271, 277, 323/282, 283, 284, 285, 286; 363/17, 21.12; 307/11, 28, 29, 30, 38, 41; 455/110, 234.1, 455/550.1, 127.1
See application file for complete search history.

(56) References Cited

U.S. PATENT DOCUMENTS

| | | | |
|---|---|---|---|
| 6,438,360 B1 * | 8/2002 | Alberth et al. | 455/110 |
| 6,608,470 B1 * | 8/2003 | Oglesbee et al. | 320/136 |
| 2004/0097208 A1 * | 5/2004 | Kasperkovitz | 455/234.1 |
| 2005/0243894 A1 * | 11/2005 | Chen et al. | 375/139 |

* cited by examiner

*Primary Examiner*—Akm E Ullah
*Assistant Examiner*—M'Baye Diao
(74) *Attorney, Agent, or Firm*—Withrow & Terranova, P.L.L.C.

(57) ABSTRACT

The present invention is a high efficiency AM switching voltage regulator used to provide an AM output signal to an AM RF power amplifier, wherein the AM output signal is proportional to an AM input signal. The AM output signal includes an AM output voltage and an AM supply current, which represents a sum of an AM output current and a shunt current. The AM output voltage provides an envelope supply voltage to the AM RF power amplifier. The switching voltage regulator includes a switching current regulator coupled to a linear shunt voltage regulator. The switching current regulator provides AM output current for the AM RF power amplifier and a small amount of shunt current for the linear shunt voltage regulator, which regulates the AM output voltage by controlling the shunt current. The switching current regulator regulates the AM supply current in proportion to a time-averaged value of shunt current.

20 Claims, 12 Drawing Sheets

AMPLITUDE MODULATED SWITCHING VOLTAGE REGULATOR

FIELD OF THE INVENTION

The present invention relates to switching voltage regulators, which are used in radio frequency (RF) transmitters as part of wireless communications systems.

BACKGROUND OF THE INVENTION

With the growth of the wireless communications industry, battery-powered mobile terminals, such as mobile telephones, Personal Digital Assistants (PDAs), and the like, are becoming increasingly common. Since the mobile terminals are battery-powered, power consumption must be minimized. Such terminals often include an RF transmitter with an RF power amplifier as the last active stage in the RF transmitter chain. As a result, the RF power amplifier is typically the largest power consumption device in the mobile terminal; therefore, the RF power amplifier system must be as efficient as possible.

One commonly used technique for improving the efficiency of an RF power amplifier is to feed the direct current (DC) supply voltage of the RF power amplifier with a switching voltage regulator, such that the DC supply voltage is adjusted to allow the RF power amplifier to amplify RF signals properly and in an efficient manner. A switching voltage regulator could be used with an amplitude modulated (AM) transmitter by amplitude modulating the DC supply voltage for maximum efficiency. Such an AM transmitter could be part of a polar modulated RF transmitter. Polar modulated RF transmitters utilize both amplitude modulation and phase modulation (PM) to maximize the amount of information that can be encoded with minimum bandwidth.

A switching voltage regulator uses a switching device, such as a transistor, to connect and disconnect a system DC supply voltage to energy storage and filtering components, such as inductors or capacitors. By controlling the duty cycle of the switching device, the output voltage of the switching regulator can be regulated. The switching frequency of the switching device determines the frequency of ripple voltage on the output voltage. Often, a low drop-out (LDO) linear voltage regulator is used to minimize the effects of ripple voltage, and is connected in series with the output of the switching voltage regulator to provide the DC supply voltage to the RF power amplifier. The efficiency of such an arrangement is limited by the voltage drop across the LDO voltage regulator.

An AM switching voltage regulator must change its output voltage in proportion to an AM input signal. One technique is to use a switching voltage regulator with a series LDO voltage regulator. For the output voltage to be proportional to the AM input signal, the switching frequency of the switching voltage regulator must be larger than the frequency of the AM input signal, or the voltage drop across the LDO voltage regulator must be increased. This trade-off between increasing the switching frequency versus increasing the voltage drop across the LDO voltage regulator limits the efficiency of this technique. Thus, there is a need for a high efficiency AM switching voltage regulator.

SUMMARY OF THE INVENTION

The present invention is a high efficiency AM switching voltage regulator used to provide an AM output signal to an AM RF power amplifier, wherein the AM output signal is proportional to an AM input signal. The AM output signal includes an AM output voltage and an AM supply current, which represents a sum of an AM output current and a shunt current The AM output voltage provides an envelope supply voltage to the AM RF power amplifier. The switching voltage regulator includes a switching current regulator coupled to a linear shunt voltage regulator. The switching current regulator provides AM output current for the AM RF power amplifier and a small amount of shunt current for the linear shunt voltage regulator, which regulates the AM output voltage by controlling the shunt current. The switching current regulator regulates the AM supply current in proportion to a time-averaged value of shunt current.

Some embodiments of the present invention may use feed-forward circuitry to adjust pulse-width modulation circuitry in the switching current regulator based on the AM input signal to help maintain constant shunt current. By maintaining constant shunt current, the average value of shunt current can be minimized, thereby maximizing the efficiency of the AM switching voltage regulator.

Those skilled in the art will appreciate the scope of the present invention and realize additional aspects thereof after reading the following detailed description of the preferred embodiments in association with the accompanying drawing figures.

BRIEF DESCRIPTION OF THE DRAWING FIGURES

The accompanying drawing figures incorporated in and forming a part of this specification illustrate several aspects of the invention, and together with the description serve to explain the principles of the invention.

Figure 4:
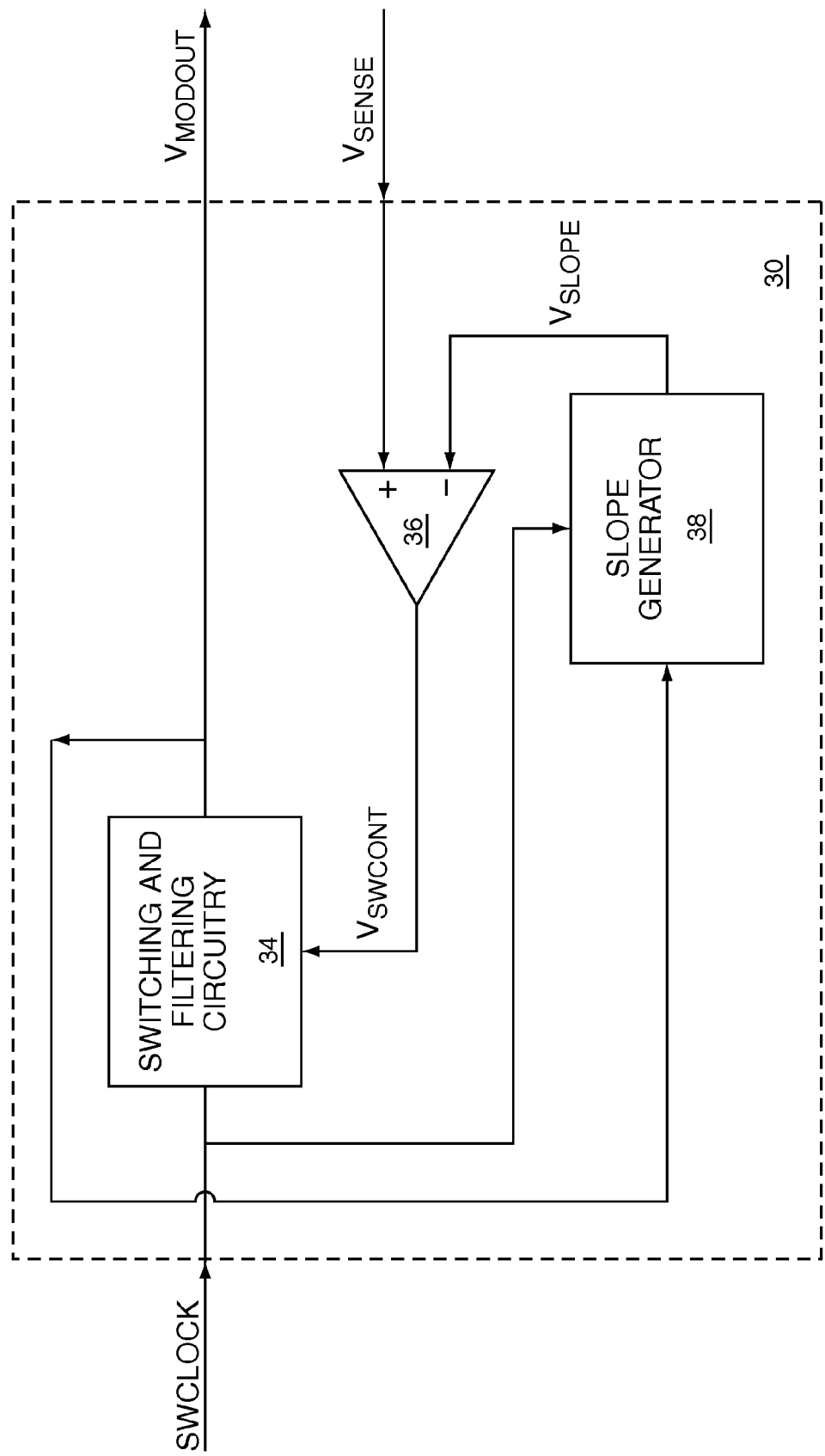
FIG. 4 shows details of the switching current regulator used in the high efficiency AM switching voltage regulator of FIG. 3, wherein the AM output signal is used to help maintain constant shunt current.
Figure 7:
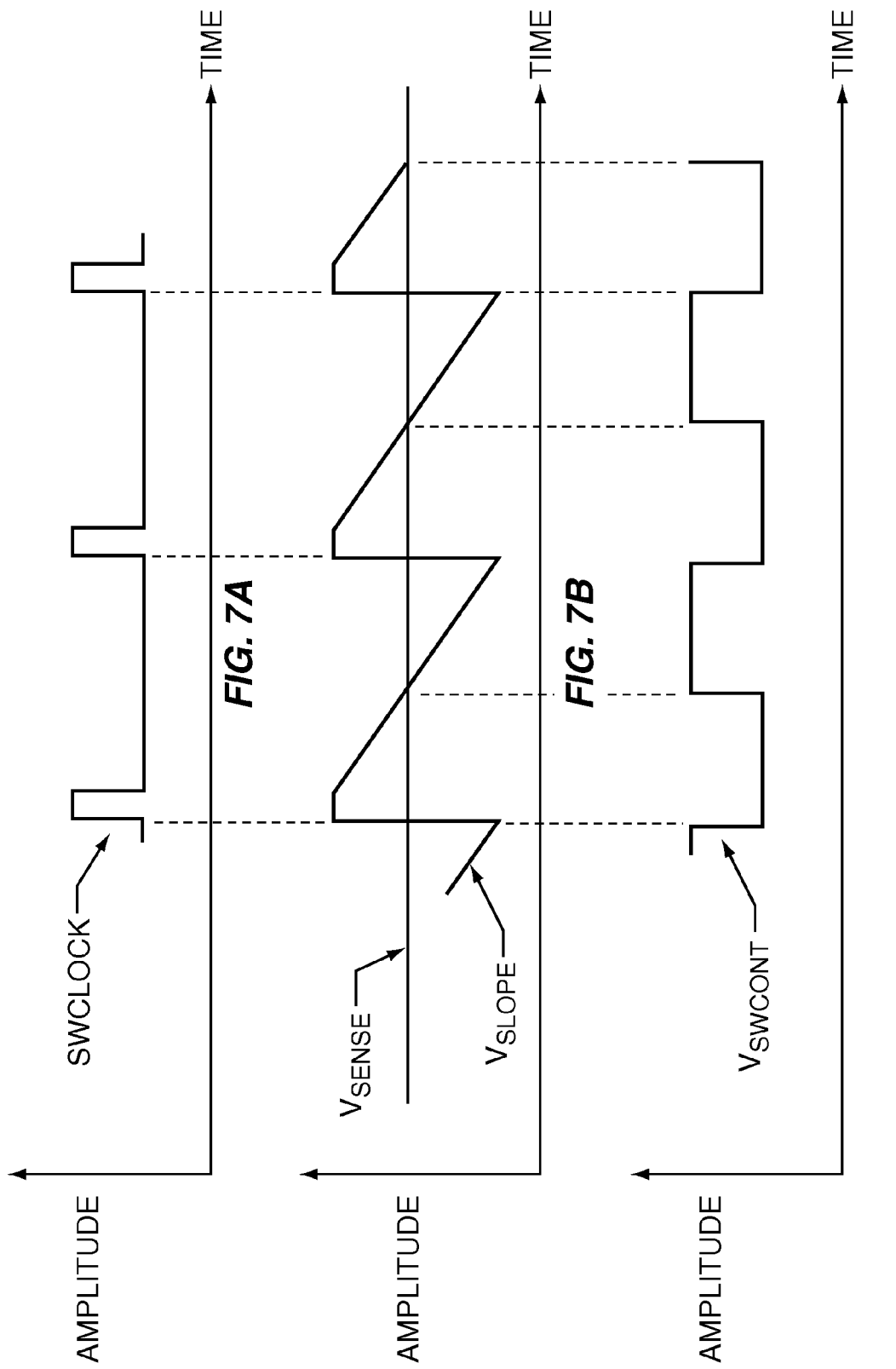

FIG. 7 details behaviors of certain signals shown in FIG. 4.

Figure 8:
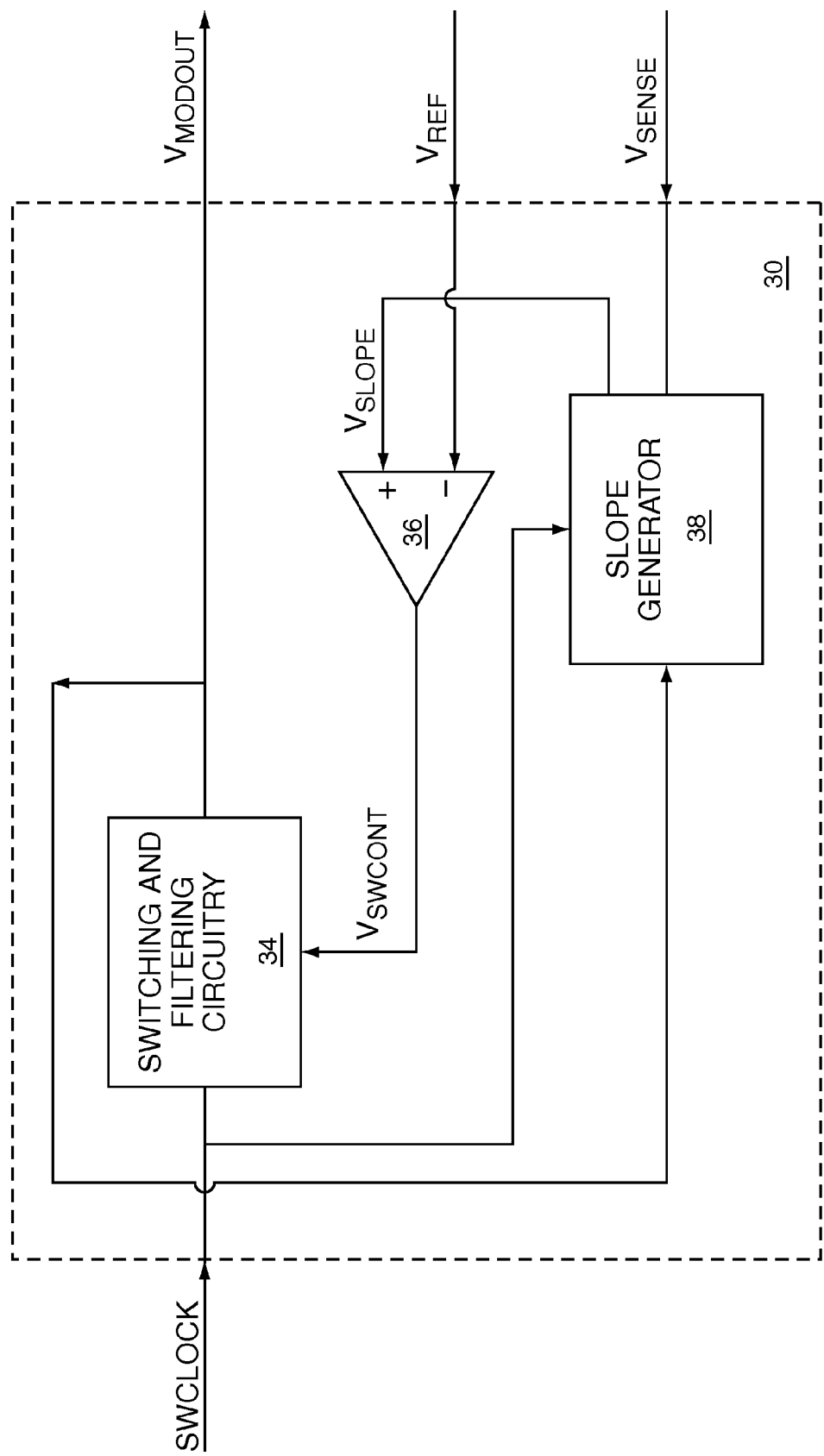

FIG. 8 shows an alternate embodiment to the details of the switching current regulator shown in FIG. 4.

Figure 9:
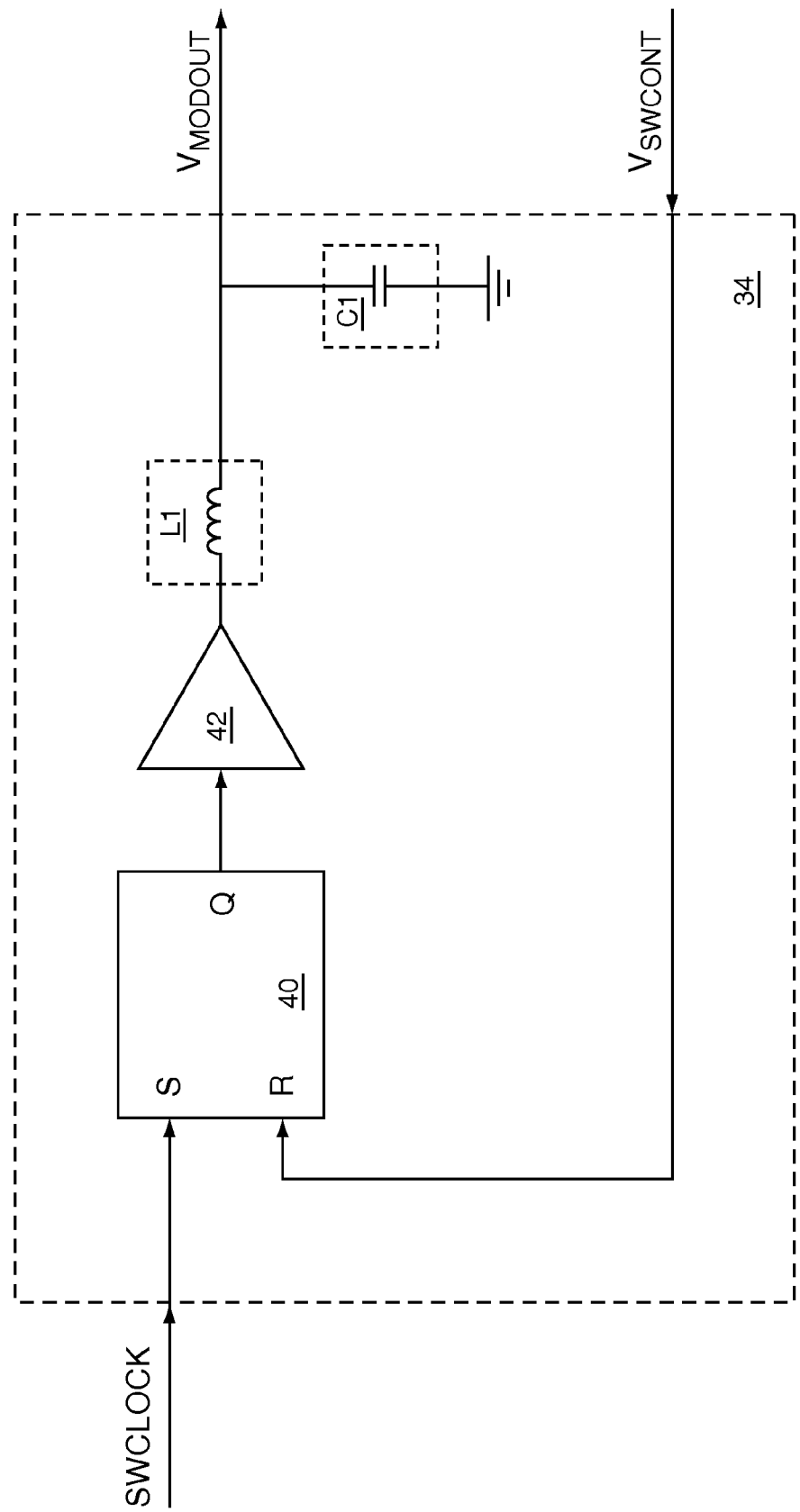

FIG. 9 shows details of the switching and filtering circuitry of FIG. 8.

Figure 10:
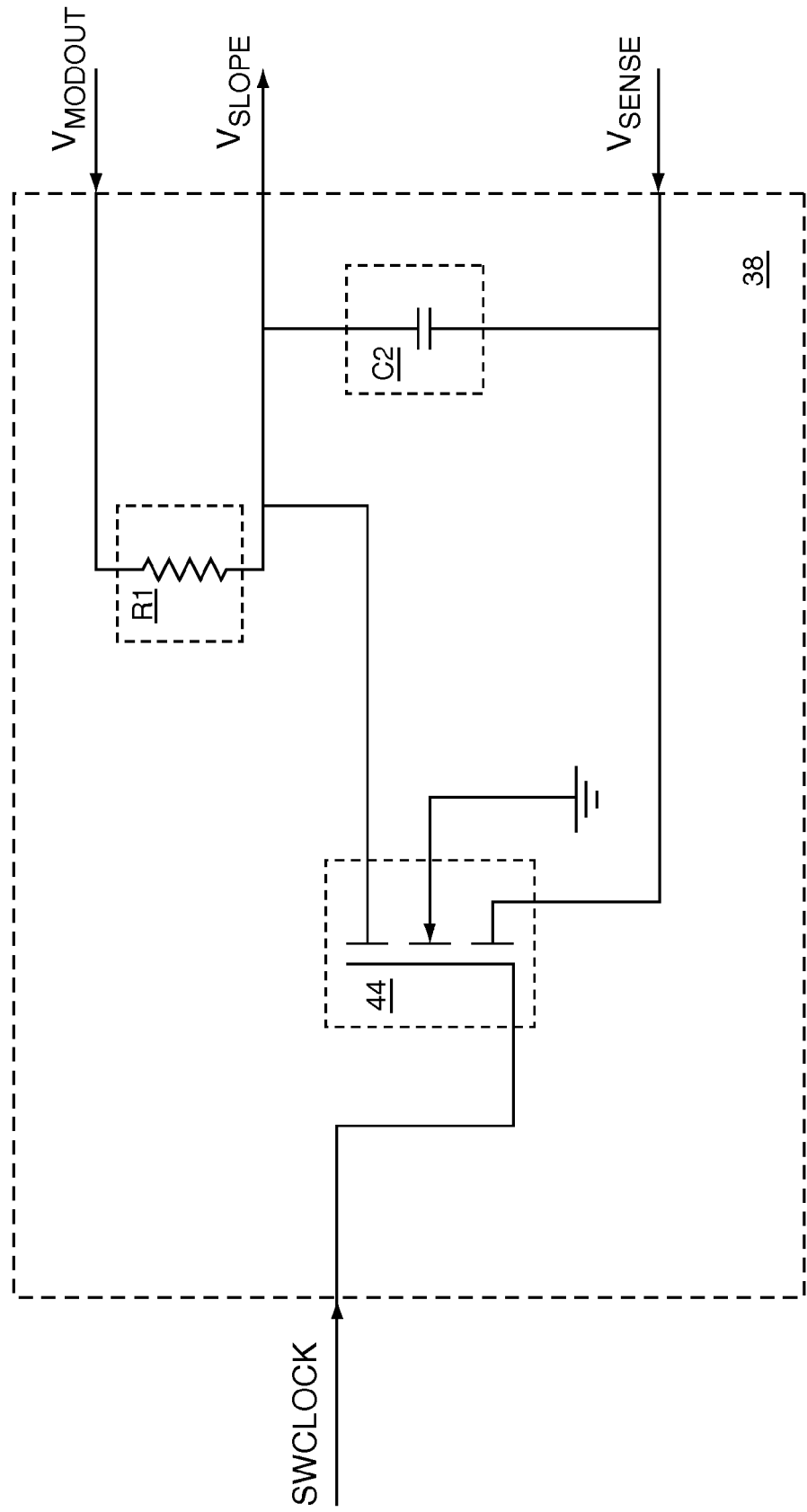

FIG. 10 shows details of the slope generator circuitry of FIG. 8.

Figure 3:
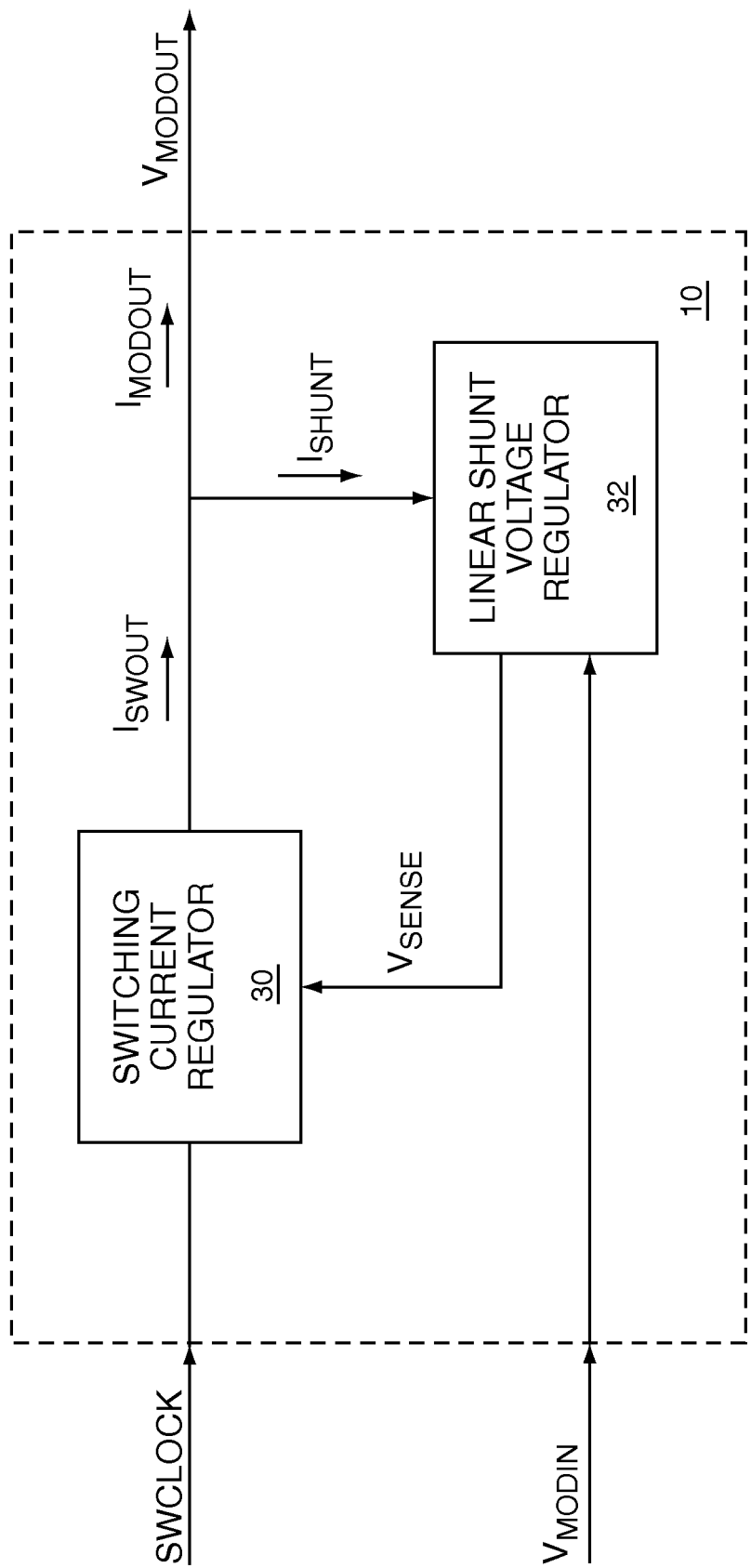
FIG. 3 shows details of the high efficiency AM switching voltage regulator of FIGS. 1 and 2.
Figure 11:
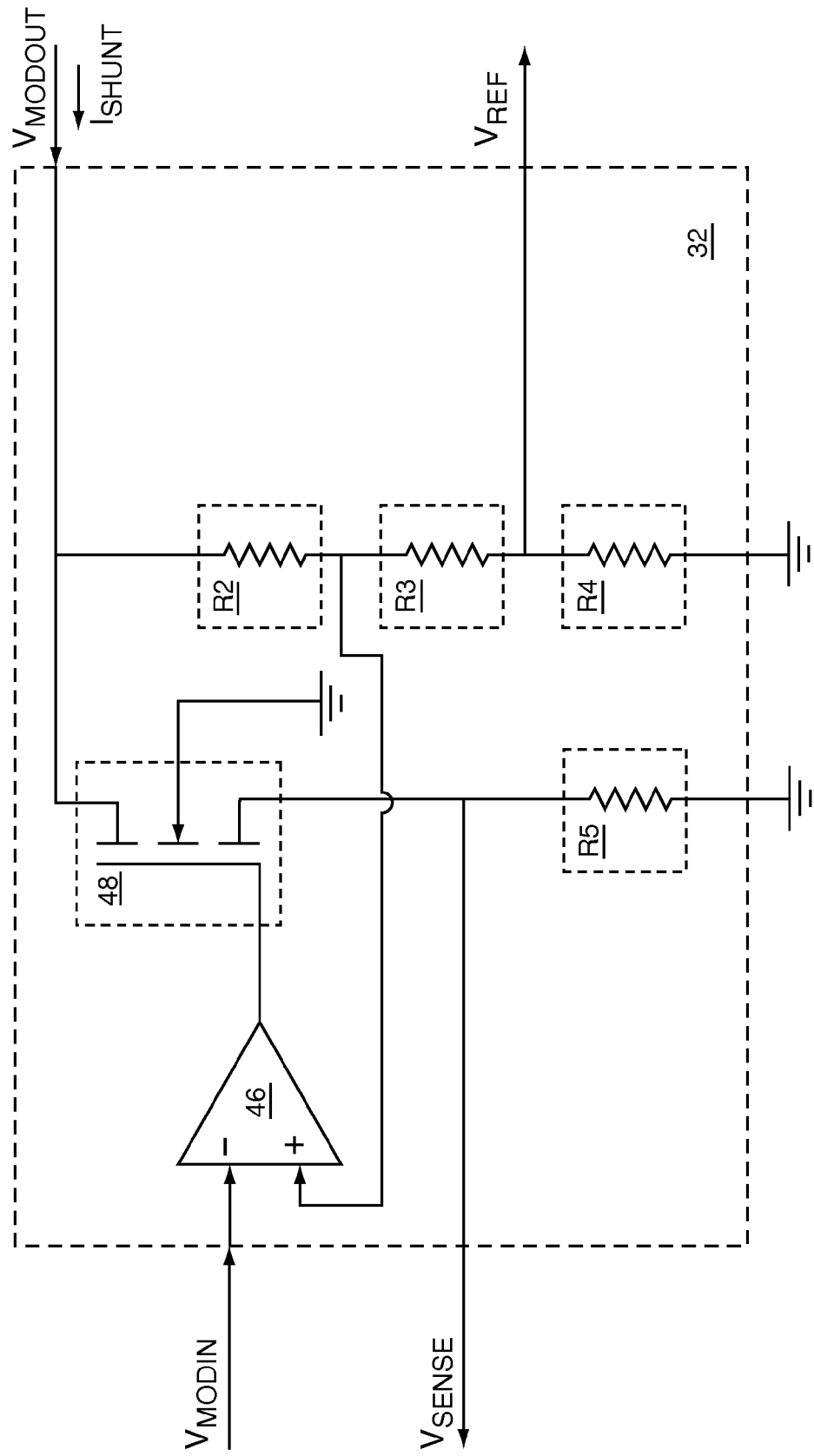

FIG. 11 shows details of the linear shunt voltage regulator of FIG. 3.

Figure 12:
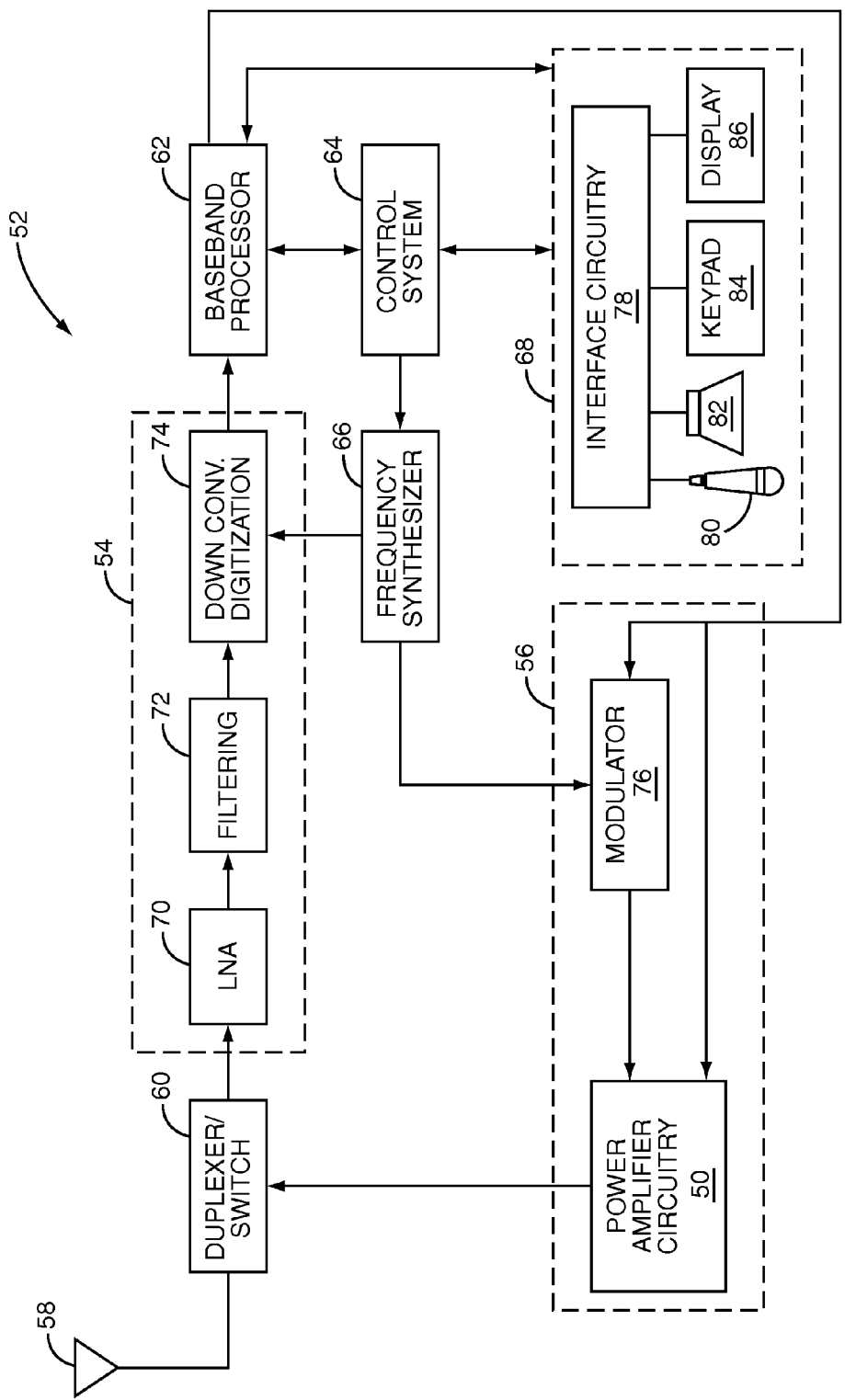

FIG. 12 shows an application example of a high efficiency AM switching voltage regulator used in power amplifier circuitry in a mobile terminal.

DETAILED DESCRIPTION OF THE PREFERRED EMBODIMENTS

The embodiments set forth below represent the necessary information to enable those skilled in the art to practice the invention and illustrate the best mode of practicing the invention. Upon reading the following description in light of the accompanying drawing figures, those skilled in the art will understand the concepts of the invention and will recognize applications of these concepts not particularly addressed herein. It should be understood that these concepts and applications fall within the scope of the disclosure and the accompanying claims.

The present invention is a high efficiency AM switching voltage regulator used to provide an AM output signal to an AM RF power amplifier, wherein the AM output signal is proportional to an AM input signal. The AM output signal includes an AM output voltage and an AM supply current, which represents a sum of an AM output current and a shunt current The AM output voltage provides an envelope supply voltage to the AM RF power amplifier. The switching voltage regulator includes a switching current regulator coupled to a linear shunt voltage regulator. The switching current regulator provides AM output current for the AM RF power amplifier and a small amount of shunt current for the linear shunt voltage regulator, which regulates the AM output voltage by controlling the shunt current. The switching current regulator regulates the AM supply current in proportion to a time-averaged value of shunt current.

Some embodiments of the present invention may use feed-forward circuitry to adjust pulse-width modulation circuitry in the switching current regulator based on the AM input signal to help maintain constant shunt current. By maintaining constant shunt current, the average value of shunt current can be minimized, thereby maximizing the efficiency of the AM switching voltage regulator.

The linear shunt voltage regulator has a high gain-bandwidth product to respond quickly to changes in the AM input signal. The switching current regulator has a lower gain-bandwidth product than the linear shunt voltage regulator, which allows low switching frequencies in the switching current regulator.

Figure 1:
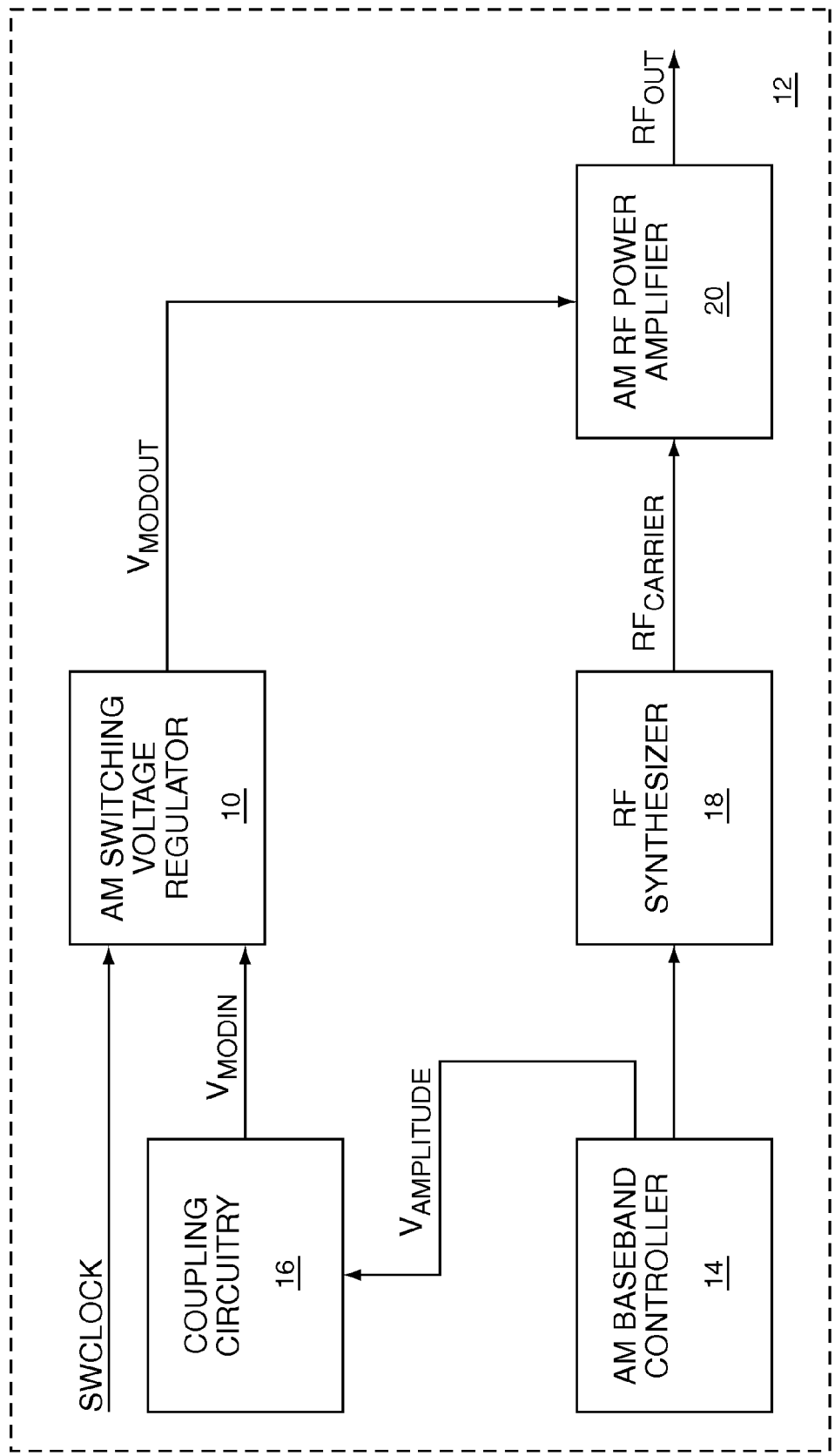
FIG. 1 shows a high efficiency AM switching voltage regulator used in an AM transmitter.

As shown in FIG. 1, a first embodiment of the present invention is a high efficiency AM switching voltage regulator 10 used in an AM transmitter 12. An AM baseband controller 14 encodes data for transmission in an AM modulation signal $V_{AMPLITUDE}$, which feeds the AM switching voltage regulator 10 through coupling circuitry 16. The AM baseband controller 14 provides the appropriate transmit channel information to an RF synthesizer 18, which generates an RF carrier signal $RF_{CARRIER}$ for an AM RF power amplifier 20. Using the AM modulation signal $V_{AMPLITUDE}$, the coupling circuitry 16 provides an AM input signal $V_{MODIN}$ to the AM switching voltage regulator 10, which provides a low impedance AM output signal $V_{MODOUT}$ to the AM RF power amplifier 20 based on $V_{MODIN}$. The AM switching voltage regulator 10 is a high efficiency design using switching power supply technology, which is driven from a switching clock signal SWCLOCK. The AM RF power amplifier 20 amplifies and modulates $RF_{CARRIER}$ to create an AM RF output signal $RF_{OUT}$. The low impedance AM output signal $V_{MODOUT}$ provides an envelope supply voltage to the AM RF power amplifier 20 that creates the amplitude of the AM RF output signal $RF_{OUT}$. By following the amplitude, the voltage drop between the supply voltage input and the RF output is minimized, and the efficiency of the AM RF power amplifier 20 is maximized.

Figure 2:
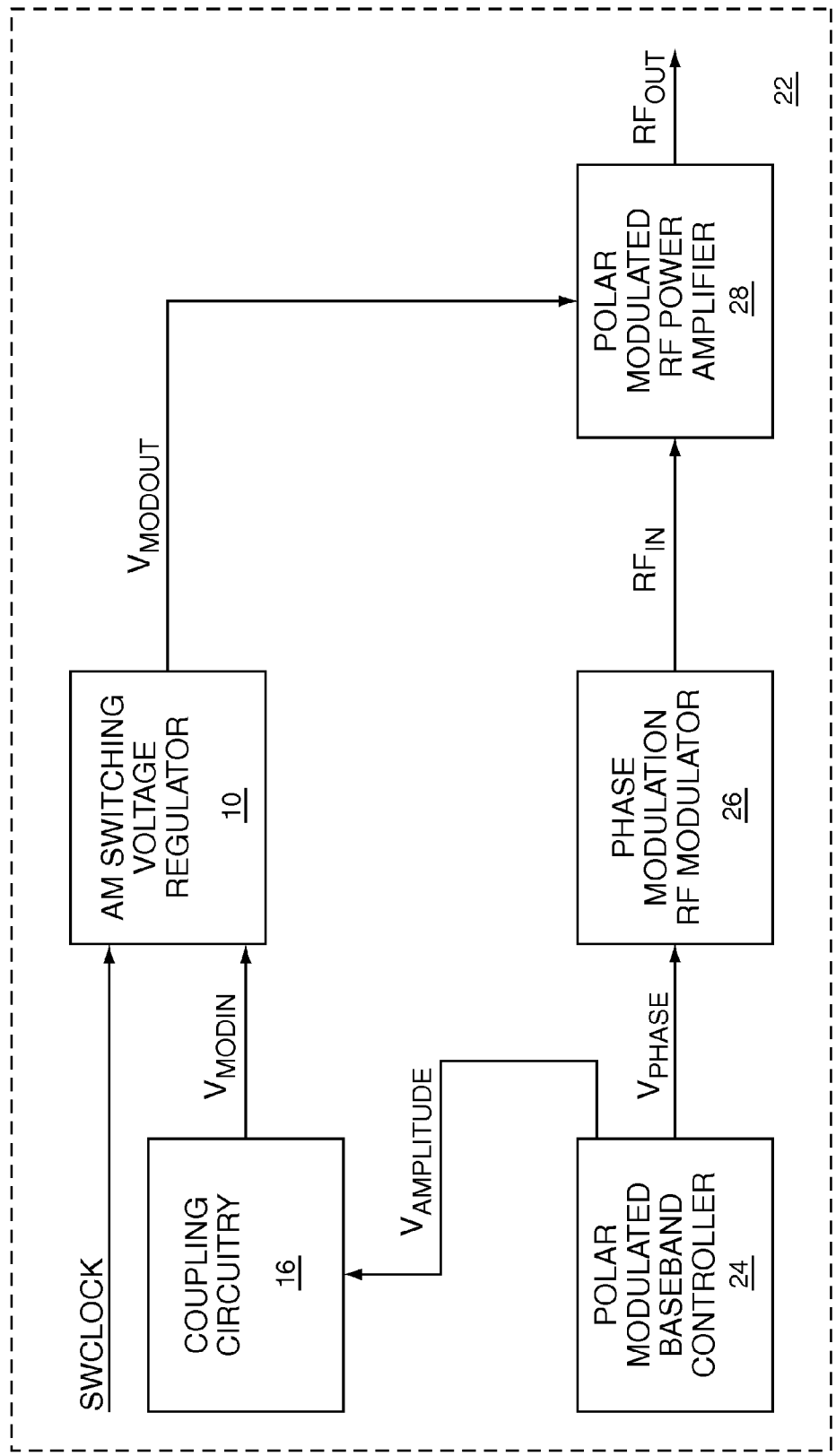
FIG. 2 shows a high efficiency AM switching voltage regulator used in a polar modulated transmitter.

As shown in FIG. 2, a second embodiment of the present invention is a high efficiency AM switching voltage regulator 10 used in a polar modulated transmitter 22. A polar modulated baseband controller 24 encodes data for transmission in an AM modulation signal $V_{AMPLITUDE}$ and a phase modulation signal $V_{PHASE}$, which feed a polar modulation RF modulator 26 and coupling circuitry 16. The polar modulation RF modulator 26 phase modulates an RF carrier signal to create a phase modulated RF input signal $RF_{IN}$ for a polar modulated RF power amplifier 28. Using the AM modulation signal $V_{AMPLITUDE}$, the coupling circuitry 16 provides the AM input signal $V_{MODIN}$ to the AM switching voltage regulator 10, which provides the low impedance AM output signal $V_{MODOUT}$ to the polar modulated RF power amplifier 28. The polar modulated RF power amplifier 28 amplifies and amplitude modulates $RF_{IN}$ to create a polar modulated RF output signal $RF_{OUT}$. The low impedance AM output signal $V_{MODOUT}$ provides an envelope supply voltage to the polar modulated RF power amplifier 28 that creates the amplitude of the polar modulated RF output signal $RF_{OUT}$. By following the amplitude, a voltage drop between a supply voltage input and an RF output is minimized, and the efficiency of the polar modulated RF power amplifier 28 is maximized.

Details of the AM switching voltage regulator 10 are shown in FIG. 3. A switching current regulator 30 provides the AM output signal $V_{MODOUT}$, which includes an AM output voltage and an AM output current $I_{MODOUT}$. The switching current regulator 30 provides an AM supply current $I_{SWOUT}$, which is split into $I_{MODOUT}$ and a shunt current $I_{SHUNT}$. A linear shunt voltage regulator 32 receives the AM input signal $V_{MODIN}$ and regulates the voltage of the AM output signal $V_{MODOUT}$ by controlling the shunt current $I_{SHUNT}$ based on $V_{MODIN}$. The linear shunt voltage regulator 32 provides a sense signal $V_{SENSE}$, which is based on $I_{SHUNT}$, to the switching current regulator 30. The switching current regulator 30 regulates the AM supply current $I_{SWOUT}$ based on $V_{SENSE}$.

In one embodiment of the present invention, the linear shunt voltage regulator 32 may regulate the voltage of the AM output signal $V_{MODOUT}$ to be substantially proportional to the AM input signal $V_{MODIN}$ by controlling the shunt current $I_{SHUNT}$ based on $V_{MODIN}$. The sense signal $V_{SENSE}$ may be substantially proportional to the shunt current $I_{SHUNT}$. The switching current regulator 30 may regulate the AM supply current $I_{SWOUT}$ to be substantially proportional to the sense signal $V_{SENSE}$.

In one embodiment of the present invention, the linear shunt voltage regulator 32 may regulate the voltage of the AM output signal $V_{MODOUT}$ to be substantially proportional to a sum of the AM input signal and an offset by controlling the shunt current $I_{SHUNT}$ based on $V_{MODIN}$. The sense signal $V_{SENSE}$ may be substantially proportional to a sum of the shunt current $I_{SHUNT}$ and an offset. The switching current regulator 30 may regulate the AM supply current $I_{SWOUT}$ to be substantially proportional to a sum of the sense signal $V_{SENSE}$ and an offset.

In another embodiment of the present invention, the linear shunt voltage regulator 32 may regulate the voltage of the AM output signal $V_{MODOUT}$ to be substantially inversely proportional to the AM input signal $V_{MODIN}$ by controlling the shunt current $I_{SHUNT}$ based on $V_{MODIN}$. The sense signal $V_{SENSE}$ may be substantially inversely proportional to the shunt current $I_{SHUNT}$. The switching current regulator 30 may regulate the AM supply current $I_{SWOUT}$ to be substantially inversely proportional to the sense signal $V_{SENSE}$.

In one embodiment, the linear shunt voltage regulator 32 may regulate the voltage of the AM output signal $V_{MODOUT}$ to be substantially inversely proportional to a sum of the AM input signal and an offset by controlling the shunt current $I_{SHUNT}$ based on $V_{MODIN}$. The sense signal $V_{SENSE}$ may be substantially inversely proportional to a sum of the shunt current $I_{SHUNT}$ and an offset. The switching current regulator 30 may regulate the AM supply current $I_{SWOUT}$ to be substantially inversely proportional to a sum of the sense signal $V_{SENSE}$ and an offset.

Details of the switching current regulator 30 of FIG. 3 are shown in FIG. 4, which may use feed-forward circuitry to adjust pulse-width modulation circuitry in the switching current regulator 30 based on the AM output signal $V_{MODOUT}$ to help maintain constant shunt current $I_{SHUNT}$. The switching current regulator 30 includes switching and filtering circuitry 34, which generates the AM output signal $V_{MODOUT}$ based on a pulse width modulated (PWM) control signal $V_{SWCONT}$ that is gated by the switching clock signal SWCLOCK. $V_{SWCONT}$ is generated by a PWM comparator 36 that compares the sense signal $V_{SENSE}$ and a slope signal $V_{SLOPE}$, which is generated by a slope generator 38. The slope signal $V_{SLOPE}$ is gated by SWCLOCK and is based on $V_{MODOUT}$.

In one embodiment of the present invention, the switching current regulator 30 may regulate the AM supply current $I_{SWOUT}$ to be substantially proportional to the AM output voltage. Alternatively, the switching current regulator 30 may regulate the AM supply current $I_{SWOUT}$ to be substantially proportional to the sum of the AM output voltage and an offset.

Figure 5:
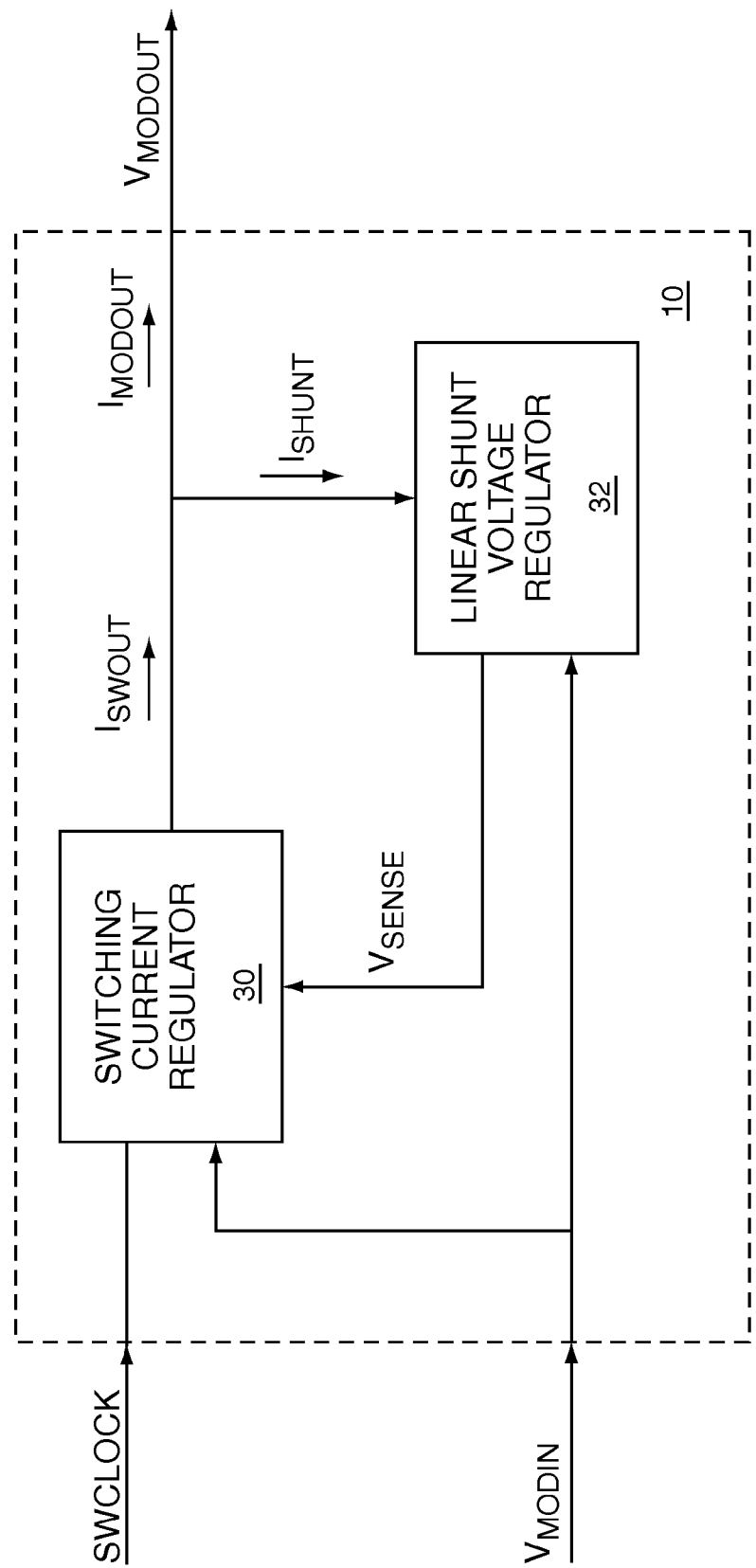
FIG. 5 shows details of the high efficiency AM switching voltage regulator of FIGS. 1 and 2, wherein the AM input signal is used to help maintain constant shunt current.
Figure 6:
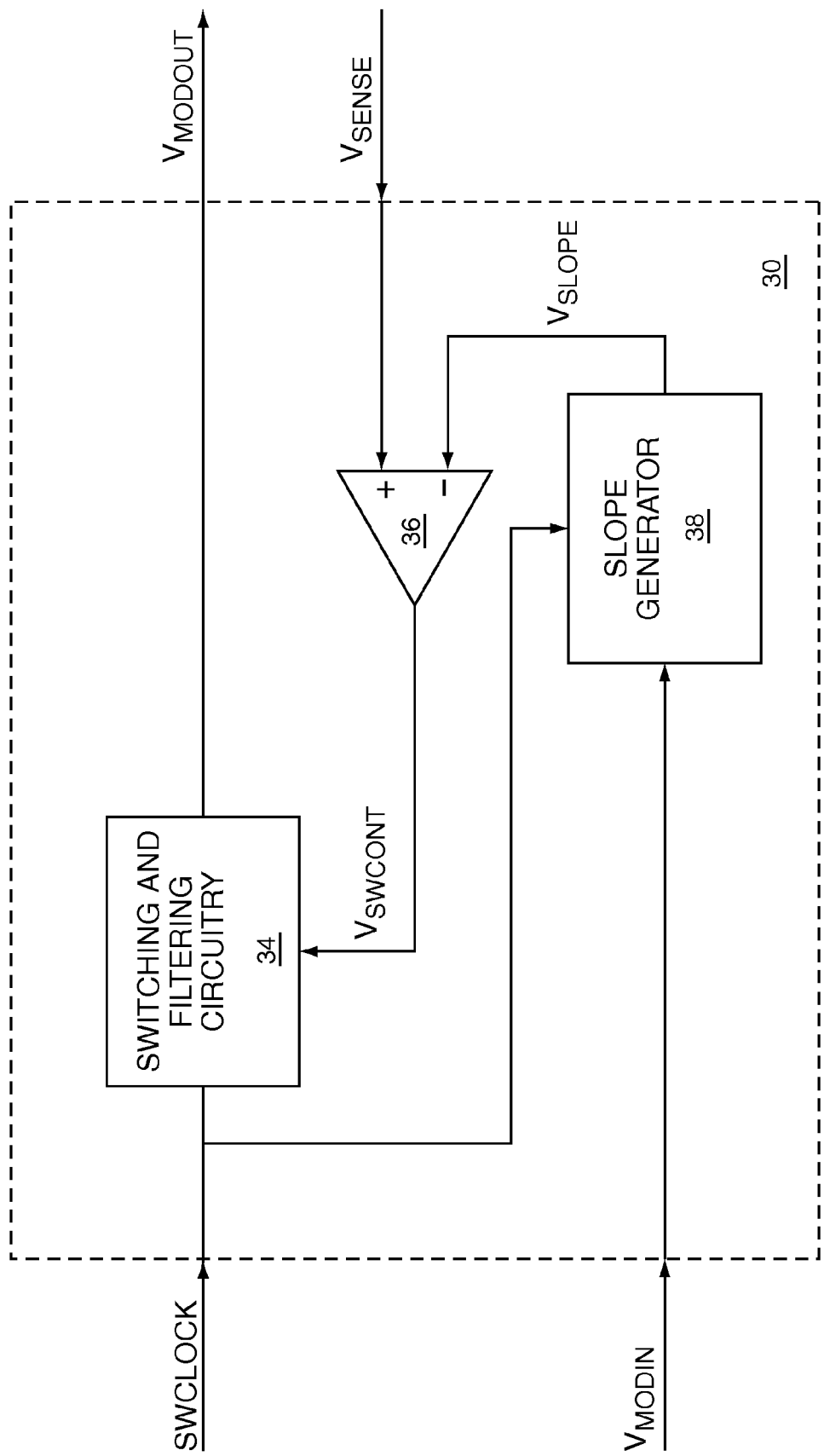
FIG. 6 shows details of the switching current regulator used in the high efficiency AM switching voltage regulator of FIG. 5.

With reference to FIG. 5, one embodiment of the present invention may use feed-forward circuitry to adjust pulse-width modulation circuitry in the switching current regulator 30 based on the AM input signal $V_{MODIN}$ to help maintain constant shunt current $I_{SHUNT}$. FIG. 5 adds $V_{MODIN}$ to the switching current regulator 30 of FIG. 3. FIG. 6 shows details of the switching current regulator 30 of FIG. 5, which is similar to the details of the switching current regulator 30 of FIG. 4. The difference is that the slope signal $V_{SLOPE}$ is based on $V_{MODIN}$ instead of $V_{MODOUT}$.

FIG. 7A shows the switching clock signal SWCLOCK. The slope signal $V_{SLOPE}$ is set to a maximum amplitude, which is normally higher than the amplitude of the sense signal $V_{SENSE}$, with the rising edge of SWCLOCK, as shown in FIG. 7B. Since $V_{SENSE}$ feeds the non-inverting input and $V_{SLOPE}$ feeds the inverting input of the PWM comparator 36, the PWM control signal $V_{SWCONT}$ goes low as shown in FIG. 7C. When SWCLOCK goes low, $V_{SLOPE}$ ramps down in a substantially linear manner. When the amplitude of $V_{SLOPE}$ becomes less than the amplitude of $V_{SENSE}$, $V_{SWCONT}$ goes high until the next rising edge of SWCLOCK. As the amplitude of $V_{SENSE}$ increases, the duty cycle of $V_{SWCONT}$ increases, and as the amplitude of $V_{SENSE}$ decreases, the duty cycle of $V_{SWCONT}$ decreases. Therefore, the switching duty cycle of the switching and filtering circuitry 34 is controlled by $V_{SENSE}$; however, the switching duty cycle can also be controlled by varying the maximum amplitude, minimum amplitude, slope, or a combination thereof, of $V_{SLOPE}$, which may be based on the AM input signal $V_{MODIN}$.

In one embodiment of the present invention, $V_{SENSE}$ feeds the inverting input and $V_{SLOPE}$ feeds the non-inverting input of the PWM comparator 36, which produces a PWM control signal $V_{SWCONT}$ of opposite polarity. In another embodiment of the present invention, the switching current regulator 30 may regulate the AM supply current $I_{SWOUT}$ to be substantially proportional to the AM input signal $V_{MODIN}$. Alternatively, the switching current regulator 30 may regulate the AM supply current $I_{SWOUT}$ to be substantially proportional to the sum of the AM input signal $V_{MODIN}$ and an offset.

In an exemplary embodiment of the present invention, FIG. 8 shows an alternate to the switching current regulator 30 shown in FIG. 4. The sense signal $V_{SENSE}$ is used to control the maximum amplitude, minimum amplitude, slope, or a combination thereof, of the slope signal $V_{SLOPE}$. $V_{SLOPE}$ is connected to the non-inverting input of the PWM comparator 36 and a reference voltage $V_{REF}$ is connected to the inverting input of the PWM comparator 36. Alternatively, $V_{SLOPE}$ may be connected to the inverting input and $V_{REF}$ is connected to the non-inverting input of the PWM comparator 36.

FIG. 9 shows details of the switching and filtering circuitry 34 of FIG. 8. The set input (S) of a set-reset flip-flop 40 receives SWCLOCK and is set on each positive cycle of SWCLOCK. The reset input (R) to the set-reset flip-flop 40 receives the PWM control signal $V_{SWCONT}$ and is reset when $V_{SWCONT}$ goes high. The Q-output of the set-reset flip-flop 40 feeds a switching driver 42, which feeds a low pass switching filter that includes a switching inductor L1 and a switching capacitor C1. The duty-cycle of the Q-output follows the duty-cycle of the PWM control signal $V_{SWCONT}$, and determines the amplitude of $V_{MODOUT}$.

FIG. 10 shows details of the slope generator 38 of FIG. 8. A slope resistor R1 and a slope capacitor C1 are coupled in series to create the slope signal $V_{SLOPE}$. The slope resistor R1 receives $V_{MODOUT}$ to provide a slope current for the slope capacitor C1. A slope voltage is developed across the slope capacitor in proportion to the slope current. $V_{SLOPE}$ is the sum of the slope voltage and $V_{SENSE}$; therefore, both slope information and sense information are provided with one signal, namely $V_{SLOPE}$. A slope transistor 44 is coupled across the slope capacitor C1 and is driven by SWCLOCK; therefore, the slope capacitor C1 is discharged with every cycle of SWCLOCK.

In the exemplary embodiment of the present invention, FIG. 11 shows details of the linear shunt voltage regulator 32 of FIG. 3. A three element resistor divider R2, R3, R4 divides the voltage of $V_{MODOUT}$ to provide the reference voltage $V_{REF}$ and feed the non-inverting input of an operational amplifier 46. The inverting input of the operational amplifier 46 receives $V_{MODIN}$. The operational amplifier 46 drives a shunt transistor 48, which controls the shunt current $I_{SHUNT}$, to regulate the voltage of $V_{MODOUT}$. $I_{SHUNT}$ flows through a sense resistor R5 to provide the sense signal $V_{SENSE}$.

In the exemplary embodiment of the present invention, the reference voltage $V_{REF}$ may be based on the AM output voltage. In another embodiment of the present invention, the reference voltage $V_{REF}$ may be based on the AM input signal $V_{MODIN}$. In the exemplary embodiment of the present invention, the gain-bandwidth product of the switching current regulator 30 may be substantially 8.8 megahertz (Mhz), the gain-bandwidth product of the linear shunt voltage regulator 32 may be substantially 190 Mhz, the frequency of the switching clock signal SWCLOCK may be 6 Mhz, and the frequency of the AM input signal $V_{MODIN}$ may be 100 kilohertz (Khz).

With reference to FIG. 12, an application example of an AM switching voltage regulator is its use in power amplifier circuitry 50 in a mobile terminal 52. The mobile terminal 52 may include a receiver front end 54, a radio frequency transmitter section 56, an antenna 58, a duplexer or switch 60, a baseband processor 62, a control system 64, a frequency synthesizer 66, and an interface 68. The receiver front end 54 receives information bearing radio frequency signals from one or more remote transmitters provided by a base station. A low noise amplifier (LNA) 70 amplifies the signal. A filter circuit 72 minimizes broadband interference in the received signal, while downconversion and digitization circuitry 74 downconverts the filtered, received signal to an intermediate or baseband frequency signal, which is then digitized into one or more digital streams. The receiver front end 54 typically uses one or more mixing frequencies generated by the frequency synthesizer 66. The baseband processor 62 processes the digitized received signal to extract the information or data bits conveyed in the received signal. This processing typically comprises demodulation, decoding, and error correction operations. As such, the baseband processor 62 is generally implemented in one or more digital signal processors (DSPs).

On the transmit side, the baseband processor 62 receives digitized data, which may represent voice, data, or control information, from the control system 64, which it encodes for transmission. The encoded data is output to the transmitter 56 for polar modulation, where it is used by a modulator 76 to phase modulate a carrier signal that is at a desired transmit frequency and by the power amplifier circuitry 50 to amplitude modulate the phase modulated carrier signal to create a polar modulated RF signal. The power amplifier circuitry 50 delivers the polar modulated RF signal to the antenna 58 through the duplexer or switch 60.

A user may interact with the mobile terminal 52 via the interface 68, which may include interface circuitry 78 associated with a microphone 80, a speaker 82, a keypad 84, and a display 86. The interface circuitry 78 typically includes analog-to-digital converters, digital-to-analog converters, amplifiers, and the like. Additionally, it may include a voice encoder/decoder, in which case it may communicate directly with the baseband processor 62. The microphone 80 will typically convert audio input, such as the user's voice, into an electrical signal, which is then digitized and passed directly or indirectly to the baseband processor 62. Audio information encoded in the received signal is recovered by the baseband processor 62, and converted by the interface circuitry 78 into an analog signal suitable for driving the speaker 82. The keypad 84 and display 86 enable the user to interact with the mobile terminal 52, input numbers to be dialed, address book information, or the like, as well as monitor call progress information.

Those skilled in the art will recognize improvements and modifications to the preferred embodiments of the present invention. All such improvements and modifications are considered within the scope of the concepts disclosed herein and the claims that follow.

What is claimed is:

1. A switching voltage regulator comprising:
    a switching current regulator circuit adapted to provide an amplitude modulated (AM) output signal based on a sense signal, wherein the AM output signal comprises an AM output voltage and an AM supply current, which represents a sum of an AM output current and a shunt current; and
    a linear shunt voltage regulator circuit adapted to:
        provide the sense signal based on a value of the shunt current; and
        regulate the shunt current based on the AM output voltage and an AM input signal, wherein the shunt current is varied to maintain the AM output voltage based on the AM input signal.

2. The switching voltage regulator of claim 1 wherein the shunt current is varied to maintain the AM output voltage substantially proportional to the AM input signal.

3. The switching voltage regulator of claim 1 wherein the shunt current is varied to maintain the AM output voltage substantially proportional to a sum of the AM input signal and an offset.

4. The switching voltage regulator of claim 1 wherein the AM supply current is based on the sense signal.

5. The switching voltage regulator of claim 1 wherein the AM supply current is substantially proportional to the sense signal.

6. The switching voltage regulator of claim 1 wherein the AM supply current is substantially proportional to a sum of the sense signal and an offset.

7. The switching voltage regulator of claim 1 wherein the sense signal is substantially proportional to the shunt current.

8. The switching voltage regulator of claim 1 wherein the sense signal is substantially proportional to a sum of the shunt current and an offset.

9. The switching voltage regulator of claim 1 wherein the switching current regulator circuit is further adapted to vary the AM supply current based on the AM input signal.

10. The switching voltage regulator of claim 9 wherein the AM supply current is substantially proportional to the AM input signal.

11. The switching voltage regulator of claim 9 wherein the AM supply current is substantially proportional to a sum of the AM input signal and an offset.

12. The switching voltage regulator of claim 1 wherein the switching current regulator circuit further comprises:
    a switching clock signal used to clock switching circuitry;
    a pulse width modulator comparator circuit adapted to:
        receive a first comparator input signal;
        receive a second comparator input signal; and
        provide a comparator output signal, which is in a first output state when an amplitude of the first comparator input signal is greater than an amplitude of the second comparator input signal, and in a second output state when the amplitude of the second comparator input signal is greater than the amplitude of the first comparator input signal, and is used to control a duty cycle to the switching circuitry; and
    a slope generator circuit adapted to provide the first comparator input signal, wherein the amplitude of the first comparator input signal is reset to a starting value by the switching clock signal, and the amplitude of the first comparator input signal changes with time.

13. The switching voltage regulator of claim 12 wherein the first comparator input signal is based on the AM input signal.

14. The switching voltage regulator of claim 12 wherein the first comparator input signal is based on the AM output signal.

15. The switching voltage regulator of claim 12 wherein the first comparator input signal is based on the sense signal.

16. The switching voltage regulator of claim 12 wherein the second comparator input signal is based on the AM input signal.

17. The switching voltage regulator of claim 12 wherein the second comparator input signal is based on the AM output signal.

18. The switching voltage regulator of claim 12 wherein the second comparator input signal is based on the sense signal.

19. The switching voltage regulator of claim 1 wherein the AM output signal is used to supply an envelope supply voltage to an AM RF power amplifier.

20. The switching voltage regulator of claim 1 wherein a response time of the AM supply current to changes in the sense signal is longer than a response time of the AM output voltage to changes in the AM input voltage.

* * * * *